US010776205B2

(12) United States Patent
Li et al.

(10) Patent No.: US 10,776,205 B2
(45) Date of Patent: Sep. 15, 2020

(54) METHOD, APPARATUS AND COMPUTER PROGRAM PRODUCT FOR MANAGING DATA STORAGE IN DATA STORAGE SYSTEMS

(71) Applicant: EMC IP Holding Company LLC, Hopkinton, MA (US)

(72) Inventors: Wayne Weihua Li, Beijing (CN); Jian Gao, Beijing (CN); Jamin Kang, Beijing (CN); Sheng Wang, Beijing (CN); Charles Chun Ma, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 219 days.

(21) Appl. No.: 15/966,031

(22) Filed: Apr. 30, 2018

(65) Prior Publication Data
US 2019/0235957 A1   Aug. 1, 2019

(30) Foreign Application Priority Data
Jan. 30, 2018   (CN) .......................... 2018 1 0089375

(51) Int. Cl.
*G06F 11/00*   (2006.01)
*G06F 11/10*   (2006.01)
(Continued)

(52) U.S. Cl.
CPC ........ *G06F 11/1092* (2013.01); *G06F 3/0604* (2013.01); *G06F 3/0619* (2013.01);
(Continued)

(58) Field of Classification Search
CPC ............ G06F 11/1088; G06F 11/1092; G06F 11/2094; G06F 3/0604; G06F 3/0619;
(Continued)

(56) References Cited

U.S. PATENT DOCUMENTS 8,924,681 B1 * 12/2014 Throop ................. G06F 3/0631
                                                                      711/114
9,594,652 B1 *  3/2017 Sathiamoorthy ... G06F 11/2053
(Continued)

*Primary Examiner* — Marc Duncan
(74) *Attorney, Agent, or Firm* — Krishnendu Gupta; Nikhil Patel

(57) ABSTRACT

Techniques are disclosed for managing data storage. In one embodiment, the techniques determine one or more RAID extents having a disk extent supported by an extent of storage on a storage device in an inoperative state. Each of the RAID extents contains a respective set of disk extents allocated to that RAID extent and each disk extent is supported by an extent of storage on a storage device of the set of storage devices. The techniques also comprise evaluating a set of values, wherein each value indicates, for a corresponding pair of storage devices from the set of storage devices, a number of RAID extents which contain disk extents belonging to both storage devices of the pair. The techniques also comprise selecting, based on the said evaluation and for each of the one or more RAID extents, a free disk extent for facilitating rebuild of that RAID extent, wherein the said free disk extent is supported by an extent of storage of one of the set of storage devices other than one of the storage devices associated with that RAID extent.

15 Claims, 11 Drawing Sheets

(51) Int. Cl.
*G06F 11/20* (2006.01)
*G06F 3/06* (2006.01)
(52) U.S. Cl.
CPC .......... *G06F 3/0629* (2013.01); *G06F 3/0689* (2013.01); *G06F 11/2094* (2013.01)
(58) Field of Classification Search
CPC .... G06F 3/0629; G06F 3/0631; G06F 3/0644; G06F 3/0689
See application file for complete search history.

(56) References Cited

U.S. PATENT DOCUMENTS

| | | | |
|---|---|---|---|
| 10,140,041 B1* | 11/2018 | Dong | G06F 3/0619 |
| 10,310,752 B1* | 6/2019 | Li | G06F 3/0619 |
| 10,521,302 B1* | 12/2019 | Gao | G06F 3/0632 |
| 2017/0212705 A1* | 7/2017 | Kidney | G06F 3/0631 |

* cited by examiner

| DISK | 1 | 2 | 3 | 4 | 5 | 6 | 7 | 8 | 9 | 10 | 11 | 12 | 13 | 14 | 15 | 16 | |
|---|---|---|---|---|---|---|---|---|---|---|---|---|---|---|---|---|---|
| 1 | 0.00 | 19.00 | 19.00 | 19.00 | 19.00 | 19.00 | 19.33 | 19.33 | 18.67 | 19.33 | 19.33 | 18.67 | 18.67 | 19.33 | 18.67 | 18.67 | |
| 2 | 19.00 | 0.00 | 19.00 | 19.00 | 19.00 | 19.00 | 19.33 | 18.67 | 18.67 | 19.33 | 18.67 | 19.33 | 19.33 | 18.67 | 19.33 | 18.67 | |
| 3 | 19.00 | 19.00 | 0.00 | 19.00 | 19.00 | 19.00 | 19.33 | 19.33 | 18.67 | 19.33 | 19.33 | 18.67 | 18.67 | 19.33 | 19.33 | 18.67 | |
| 4 | 19.00 | 19.00 | 19.00 | 0.00 | 19.00 | 20.00 | 18.67 | 19.33 | 18.00 | 18.67 | 18.67 | 18.67 | 18.67 | 19.33 | 18.67 | 19.33 | ← SCORE WHEN SELECT DISK 4 |
| 5 | 19.00 | 19.00 | 19.00 | 19.00 | 0.00 | 19.00 | 18.67 | 18.67 | 18.00 | 19.33 | 19.33 | 18.67 | 18.67 | 18.67 | 18.67 | 18.67 | |
| 6 | 19.00 | 19.00 | 19.00 | 20.00 | 19.00 | 0.00 | 18.67 | 19.33 | 18.67 | 18.67 | 18.67 | 18.67 | 18.67 | 18.67 | 18.67 | 18.67 | ← SCORE WHEN SELECT DISK 6 |
| 7 | 19.33 | 19.33 | 19.33 | 18.67 | 18.67 | 18.67 | 0.00 | 19.11 | 19.11 | 19.11 | 19.11 | 19.11 | 19.11 | 19.11 | 19.11 | 19.11 | ← SCORE WHEN SELECT DISK 7 |
| 8 | 19.33 | 18.67 | 19.33 | 19.33 | 18.67 | 18.67 | 19.11 | 0.00 | 18.67 | 18.67 | 18.67 | 18.67 | 19.11 | 19.11 | 18.67 | 18.67 | ← SCORE WHEN SELECT DISK 8 |
| 9 | 18.67 | 18.67 | 18.67 | 18.00 | 18.67 | 18.67 | 19.11 | 18.67 | 0.00 | 18.67 | 18.67 | 18.67 | 19.11 | 19.11 | 19.11 | 19.11 | |
| 10 | 19.33 | 19.33 | 19.33 | 18.67 | 18.67 | 18.67 | 19.11 | 18.67 | 18.67 | 0.00 | 19.11 | 19.11 | 18.67 | 19.11 | 18.67 | 18.22 | |
| 11 | 19.33 | 18.67 | 19.33 | 18.67 | 18.67 | 18.67 | 19.11 | 18.67 | 18.67 | 19.11 | 0.00 | 19.11 | 19.11 | 19.11 | 19.11 | 18.67 | |
| 12 | 18.67 | 19.33 | 18.67 | 18.67 | 18.67 | 18.67 | 19.11 | 18.67 | 19.11 | 19.11 | 19.11 | 0.00 | 19.11 | 19.11 | 18.67 | 18.67 | |
| 13 | 18.67 | 19.33 | 18.67 | 18.67 | 18.67 | 18.67 | 19.11 | 19.11 | 19.11 | 18.67 | 19.11 | 19.11 | 0.00 | 18.67 | 19.11 | 18.67 | |
| 14 | 18.67 | 18.67 | 19.33 | 19.33 | 18.67 | 18.67 | 19.11 | 19.11 | 18.67 | 19.11 | 19.11 | 19.11 | 18.67 | 0.00 | 18.67 | 19.11 | |
| 15 | 19.33 | 19.33 | 19.33 | 18.67 | 18.67 | 18.67 | 18.67 | 18.67 | 19.11 | 18.67 | 19.11 | 18.67 | 19.11 | 18.67 | 0.00 | 18.67 | |
| 16 | 18.67 | 18.67 | 18.67 | 19.33 | 18.67 | 18.67 | 18.67 | 18.67 | 19.11 | 18.22 | 18.67 | 18.67 | 18.67 | 19.11 | 18.67 | 0.00 | ← SCORE WHEN SELECT DISK 16 |

800

... SELECT THE MINIMUM SCORE

FIG. 9

METHOD, APPARATUS AND COMPUTER PROGRAM PRODUCT FOR MANAGING DATA STORAGE IN DATA STORAGE SYSTEMS

TECHNICAL FIELD

The present invention relates to data storage. More particularly, the present invention relates to a method, an apparatus and a computer program product for managing data storage in data storage systems.

BACKGROUND OF THE INVENTION

Systems may include different resources used by one or more host processors. Resources and host processors in the system may be interconnected by one or more communication connections, such as network connections. These resources may include, for example, data storage devices such as those included in the data storage systems manufactured by Dell EMC of Hopkinton, Mass. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by Dell EMC. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

There is disclosed a method, comprising: detecting an inoperative state relating to a storage device of a set of storage devices of a data storage system; in response to detecting the inoperative state, determining one or more RAID extents having a disk extent supported by an extent of storage on the storage device associated with the inoperative state, wherein each of the RAID extents contains a respective set of disk extents allocated to that RAID extent and each disk extent is supported by an extent of storage on a storage device of the set of storage devices; evaluating a set of values, wherein each value indicates, for a corresponding pair of storage devices from the set of storage devices, a number of RAID extents which contain disk extents belonging to both storage devices of the pair; based on the said evaluation, selecting, for each of the one or more RAID extents, a free disk extent supported by an extent of storage of one of the set of storage devices other than one of the storage devices associated with that RAID extent; and rebuilding the one or more RAID extents by utilizing the free disk extents selected for the respective RAID extents to replace the disk extents supported by the storage device associated with the inoperative state.

There is also disclosed an apparatus, comprising: memory; and processing circuitry coupled to the memory, the memory storing instructions which, when executed by the processing circuitry, cause the processing circuitry to: detect an inoperative state relating to a storage device of a set of storage devices of a data storage system; in response to detecting the inoperative state, determine one or more RAID extents having a disk extent supported by an extent of storage on the storage device associated with the inoperative state, wherein each of the RAID extents contains a respective set of disk extents allocated to that RAID extent and each disk extent is supported by an extent of storage on a storage device of the set of storage devices; evaluate a set of values, wherein each value indicates, for a corresponding pair of storage devices from the set of storage devices, a number of RAID extents which contain disk extents belonging to both storage devices of the pair; based on the said evaluation, select, for each of the one or more RAID extents, a free disk extent supported by an extent of storage of one of the set of storage devices other than one of the storage devices associated with that RAID extent; and rebuild the one or more RAID extents by utilizing the free disk extents selected for the respective RAID extents to replace the disk extents supported by the storage device associated with the inoperative state.

There is also disclosed a computer program product having a non-transitory computer readable medium which stores a set of instructions, the set of instructions, when carried out by processing circuitry, causing the processing circuitry to perform a method of: detecting an inoperative state relating to a storage device of a set of storage devices of a data storage system; in response to detecting the inoperative state, determining one or more RAID extents having a disk extent supported by an extent of storage on the storage device associated with the inoperative state, wherein each of the RAID extents contains a respective set of disk extents allocated to that RAID extent and each disk extent is supported by an extent of storage on a storage device of the set of storage devices; evaluating a set of values, wherein each value indicates, for a corresponding pair of storage devices from the set of storage devices, a number of RAID extents which contain disk extents belonging to both storage devices of the pair; based on the said evaluation, selecting, for each of the one or more RAID extents, a free disk extent supported by an extent of storage of one of the set of storage devices other than one of the storage devices associated with that RAID extent; and rebuilding the one or more RAID extents by utilizing the free disk extents selected for the respective RAID extents to replace the disk extents supported by the storage device associated with the inoperative state.

BRIEF DESCRIPTION OF THE DRAWINGS

Features and advantages of the present invention will become more apparent from the following detailed description of exemplary embodiments thereof taken in conjunction with the accompanying drawings in which:

FIG. 9 is an example illustrating a neighborhood matrix/weighted neighborhood matrix defining possible new RAID extent configurations in an embodiment in accordance with techniques herein.

DETAILED DESCRIPTION

Figure 1:
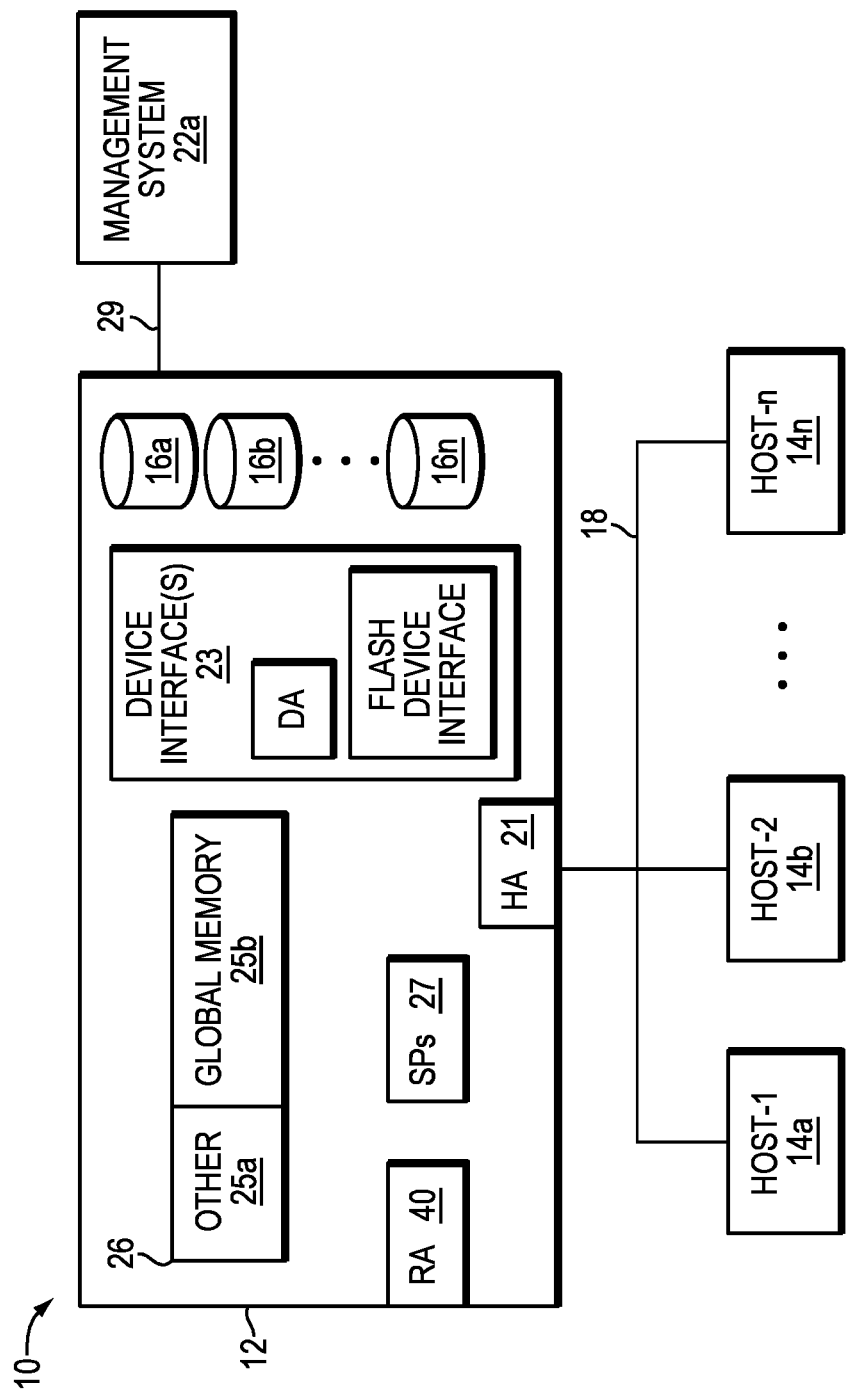
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, the n hosts 14a-14n may access the data storage system 12, for example, by issuing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by Dell EMC of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of physical data storage devices (PDs or physical devices) such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and memory 26. An embodiment, for example, may use one or more internal busses and/or communication modules. For example, global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Each of the different adapters, such as HA 21, DA or disk interface, RA, and the like, may be implemented as a hardware component including, for example, one or more processors, one or more forms of memory, and the like. Code may be stored in one or more of the memories of the component for performing processing.

An embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by Dell EMC of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

As known in the art, a RAID (redundant array of independent disks) group is a group of physical storage devices or members providing different levels of protection and fault tolerance within the RAID group. A RAID group provides an associated level of protection based on a particular configuration of the physical drives comprising the RAID group. The particular level of protection provided by a RAID group may be one of standard and/or well known levels and configurations (e.g., RAID-0, RAID-1, RAID-5, RAID-6, and the like). In at least one embodiment, physical drives may be configured into RAID groups of one or more RAID levels. As known in the art, LUNs may have storage provisioned from, or built on top of, the RAID groups.

Described in following paragraphs are techniques that may be used to layout mapped RAID extents evenly (or approximately evenly) to all physical storage devices (PDs)

of a pool. One benefit of using mapped RAID as described herein is better rebuild performance than using traditional RAID. As described in more detail below, in order to obtain improved rebuild performance with mapped RAID, techniques herein attempt to distribute mapped RAID extents as evenly as possible to the PDs. In this way, when one PD fails, all the other PDs may be involved in the rebuilding procedure. In accordance with techniques herein, processing may be performed to evenly layout RAID extents to the PDs independent of the number of PDs in the pool, independent of the number of RAID extents to be allocated, and independent of RAID extent width (e.g. number of PDs, M, in the RAID group). In at least one embodiment in accordance with techniques herein, a neighborhood matrix may be used to evaluate whether the mapped RAID extents are evenly distributed to PDs of the pool, or not. Furthermore, as described in more detail below, in at least one embodiment in accordance with techniques herein, a small subset of selection combinations may be used rather than all possible combinations to improve processing efficiency and reduce computing complexity.

As noted above, RAID may be characterized in one aspect as a data storage virtualization technology that combines multiple PDs into a single logical unit for the purposes of data redundancy, performance improvement, or both. Data is distributed across the drives in one of several ways, referred to as RAID levels, depending on the required level of redundancy and performance.

Figure 2:
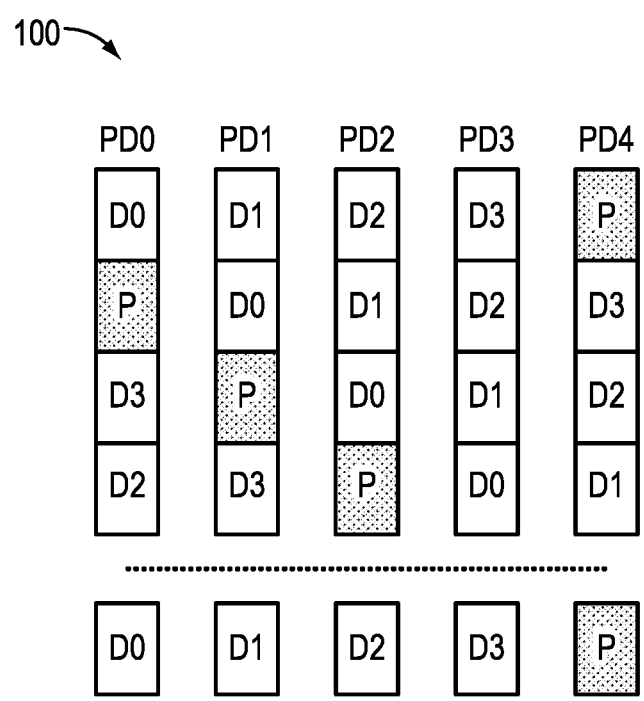
FIGS. 2 and 3 are examples illustrating a traditional RAID group configuration.
Figure 3:
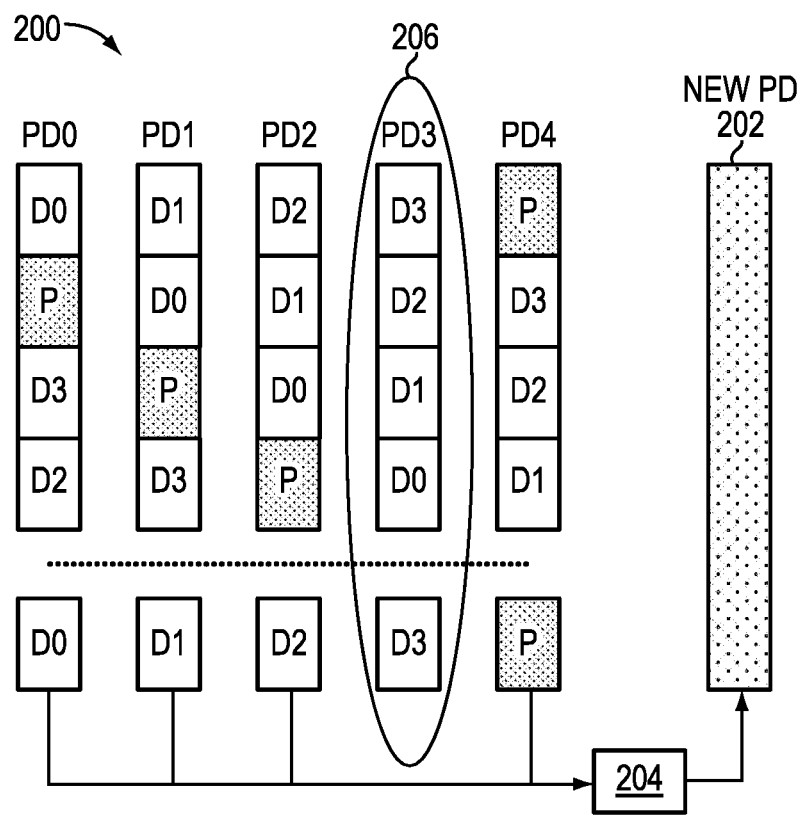

With reference now to FIG. 2, shown is an example illustrating traditional RAID 5 layout of a RAID group with 5 member PDs including 4 data PDs and 1 parity PD. As known in the art, RAID 5 provides block level striping with distributed parity. Parity information is distributed among the PDs. In the example 100 of FIG. 2, each stripe includes 5 blocks, which includes 4 data blocks (denoted as D0, D1, D2 and D3) and 1 parity block (denoted as P). Upon failure of a single PD, such as failure of PD3 206 as illustrated with reference to the example 200 of FIG. 3, subsequent reads can be calculated from the distributed parity such that no data is lost. Additionally, a hot spare PD 202 may be selected to replace the failed PD3 206 and all the data of the failed PD3 206 may be rebuilt 204 and written to the new PD 202.

With the new physical storage technologies (e.g. shingled media disk) emerging, the storage capacity of a single PD increases year by year and the rebuild time is increased accordingly. In other words, a customer may face an increased risk of double PD failure, which may result in lost data if RAID group rebuild time is not reduced. However, the rebuild time is subject to the write bandwidth of the hot spare PD replacing the failed PD. With the traditional RAID group such as in FIGS. 2 and 3, the write bandwidth of the hot spare PD may currently be a bottleneck and it may accordingly be difficult using such traditional RAID to reduce the rebuild time. As a result, mapped RAID technology described in following paragraphs may be used as described in following paragraphs.

Figure 4A:
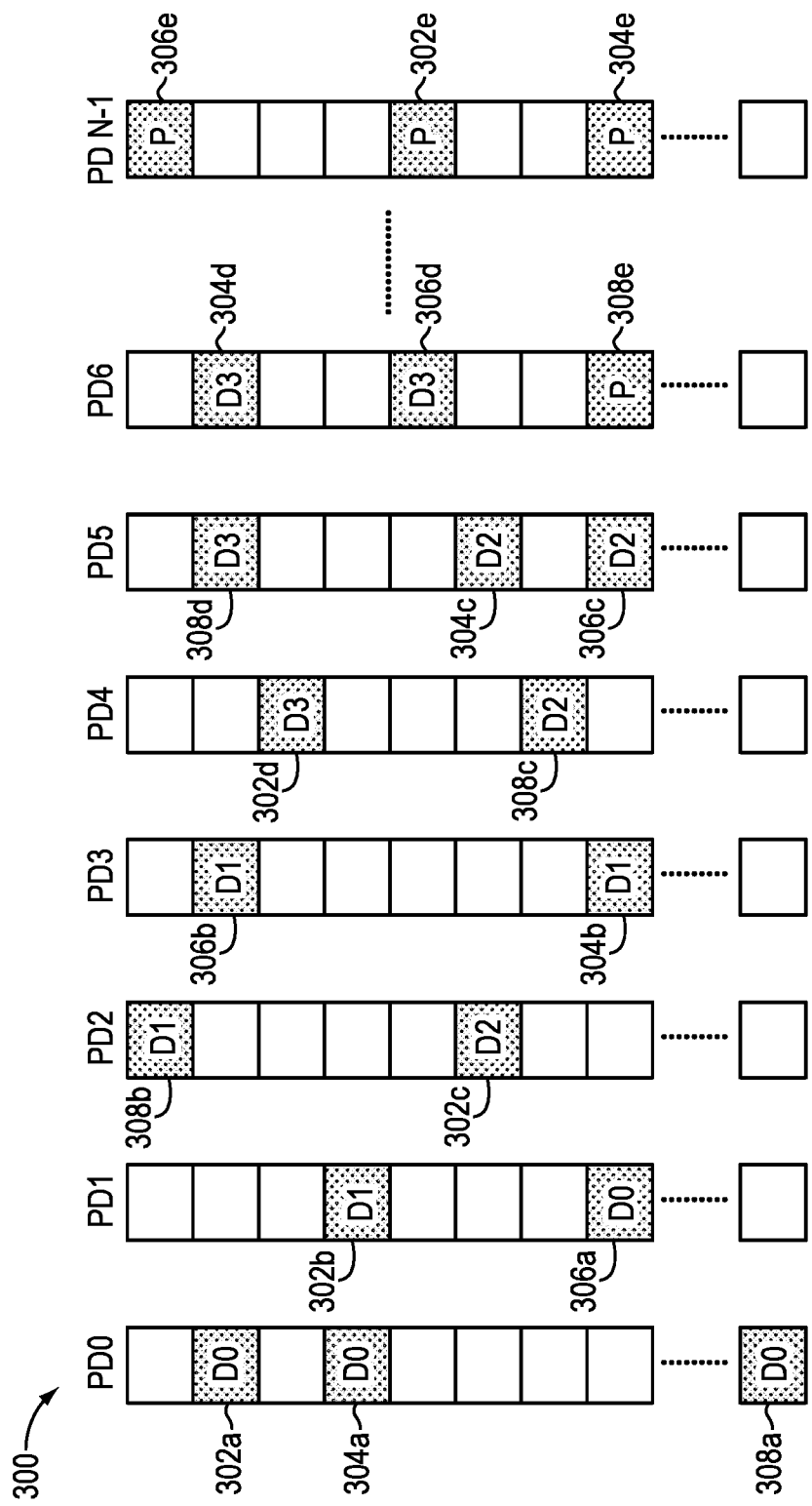
FIGS. 4A and 4B are examples illustrating mapped RAID extents in an embodiment in accordance with techniques herein.

Referring to FIG. 4A, shown is an example illustrating use of mapped RAID techniques in an embodiment in accordance with techniques herein. The example 300 includes a pool of N PDs, where N is an integer having a minimum value depending on the particular RAID configuration and drive members. The N PDs may be referred to using indices 0 through N-1, inclusively. For example, consider a RAID 5 configuration such as described above in connection with FIG. 2 having M=5 members including 4 data members and 1 parity member. The minimum number of PDs in the pools used for mapped RAID may be at least M, the number of RAID group members, which is 5 in this example. Thus, the number of PDs N is greater than or equal to M. It should be noted that the foregoing M may also denote the RAID extent width or number of disk extents in each mapped RAID extent as described in more detail elsewhere herein. Generally, mapped RAID is created on top of a pool of the N PDs. Each PD of the pool used for configuring mapped RAID may be viewed as a set of continuous non-overlapping fixed sized disk (PD) extents or portions.

Each mapped RAID extent (also referred to herein as simply RAID extent) may include M different disk extents (e.g., PD extents or portions) whereby each disk extent is selected from a different one of the N PDs. For example, a first RAID extent A may include 5 disk extents 302a-e; a second RAID extent B may include 5 disk extents 304a-e; a third RAID extent C may include 5 disk extents 306a-e; and a fourth RAID extent D may include 5 disk extents 308a-e. In this example 300, each disk or PD extent used for storing user data is denoted Dn, where n is an integer in the range of 0-3. Each disk or PD extent used for storing parity information is denote P. Disk or PD extents which are free (unallocated) or otherwise reserved may not include any P or Dn designation in FIG. 4A.

Some of the disk extents may be reserved on each of the N PDs for use as hot spare disk extents rather than reserve an entire PD as a hot spare as in traditional RAID groups. Techniques herein may select the disk extents used in forming the mapped RAID extents with a goal of evenly distributing the RAID extents to all N PDs of the pool. When one of the N PDs of the pool fails (or becomes inoperative for whatever reason), for each disk extent on the failed PD that is included in a mapped RAID extent, a replacement disk extent may be obtained by selecting another replacement disk extent from one of the other remaining active/live/healthy PDs of the pool. Such selection may be based on specified criteria. When selecting disk extents for inclusion in a mapped RAID extent for such replacement due to a failed PD, the selection criteria may include selecting the replacement disk extents so as to guarantee that each mapped RAID extent includes disk extents on 5 different PDs. Additionally, selecting replacement disk extents for dead disk extents of the failed PD may be performed in manner based on another selection criteria that distributes the dead disk extent replacements evenly among the remaining N-1 PDs of the pool.

Figure 4B:
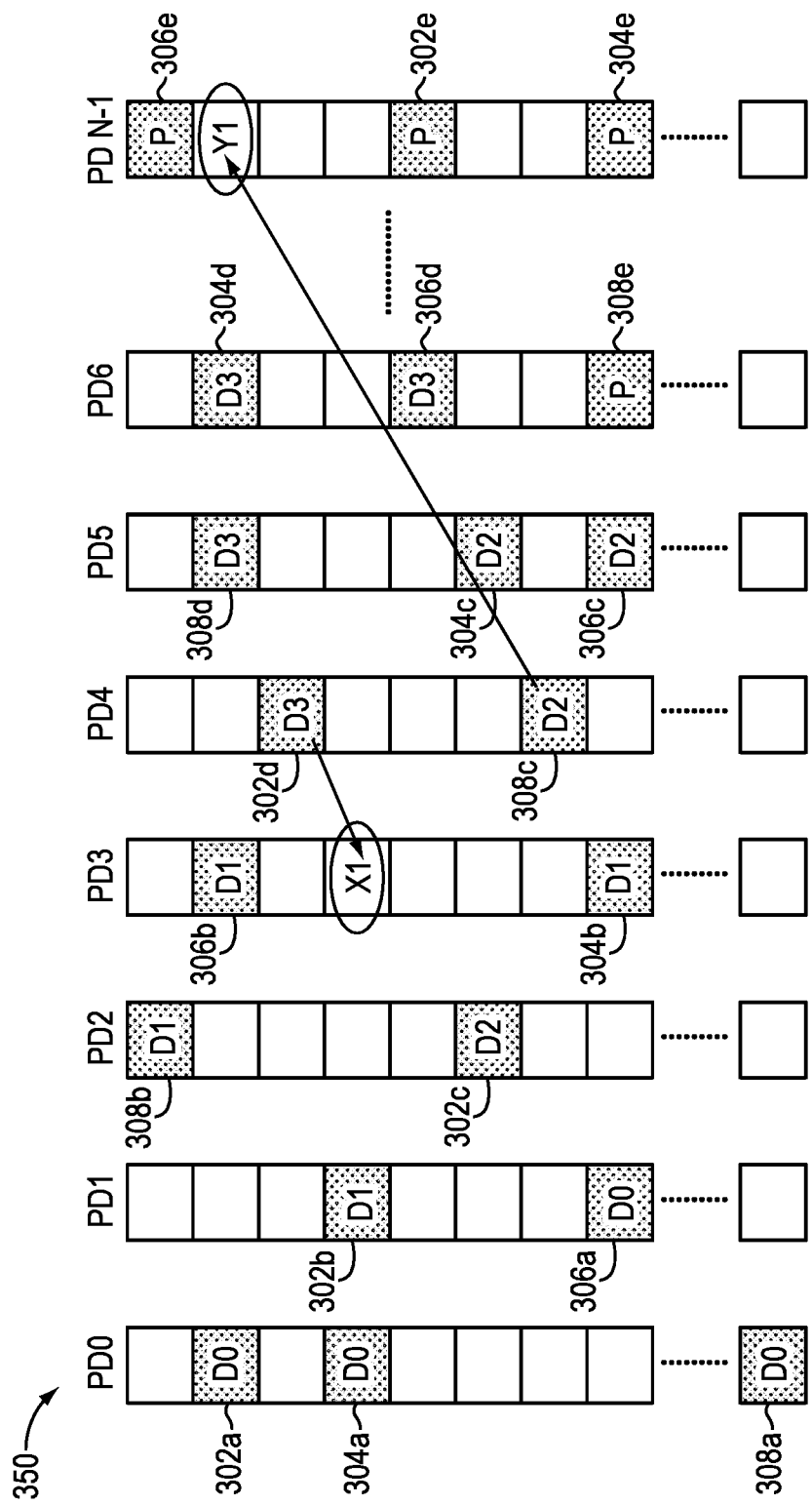

For example, with reference to FIG. 4B, assume PD4 fails whereby disk extents 302d and 308c may be relocated to another one of the remaining N-1 PDs. In accordance with the criteria noted above, disk extent 302d may be relocated to disk extent X1 on PD3, and disk extent 308c may be relocated to disk extent Y1 on PD N-1.

As may be appreciated by those skilled in the art, with mapped RAID techniques such as illustrated in FIGS. 4A and 4B, there no longer exists the limitation of the single spare PD write bandwidth, since techniques herein replace dead disk extents with extents on different PDs. Additionally, in order to maximize rebuild performance, as many PDs as possible should participate in the rebuilding procedure (as performed in connection with rebuilding or reconstructing dead disk extents using well known techniques known in the art that vary with the particular RAID level and configuration). To achieve an improved rebuild performance, techniques herein may include processing to evenly distribute (as evenly as possible) mapped RAID extents across all PDs of the pool when creating/forming mapped RAID extents.

Before describing details of processing that may be performed in an embodiment in accordance with techniques herein, what will now be described is how to evaluate/determine whether the RAID extent distribution among the N PDs of the pool is even or not. In at least one embodiment, a neighborhood matrix may be used.

Figure 5:
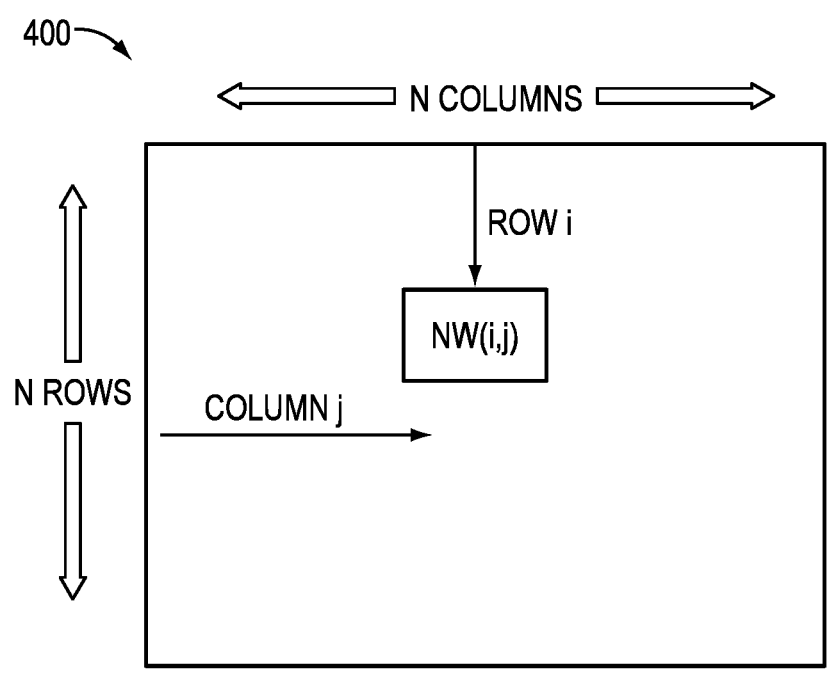
FIG. 5 is an example illustrating a neighborhood matrix that may be used in an embodiment in accordance with techniques herein.

As illustrated in FIG. 5, a neighborhood matrix is an N*N square matrix, where N is the number of PDs in the pool as described above. Each entry or cell of the matrix may be identified using a pair of coordinates, i, j, where "i" denotes the row of the matrix and "j" denotes the column of the matrix. An entry or cell of the matrix located in row i, column j, may be referred to as NW(i, j), whereby the contents of the entry or cell may be a numeric quantity identifying how many times PD i of the pool has ever neighbored with PD j of the pool. Two disk or PD extents, such as from two different PDs, may be defined as neighbor extents if both such disk or PD extents are included in the same mapped RAID extent. Thus, NW(i,j) denotes the number of times a disk extent from PDi has been selected or included in the same mapped RAID extent as a disk extent from PDj (e.g., how many times PDi and PDj have been neighbors or included in the same mapped RAID extent). While allocating a mapped RAID extent, processing includes selecting disk extents from different PDs. We define PDs in this same mapped RAID extent as neighbors with each other one time. The neighborhood matrix is symmetric, since based on the foregoing definition of "neighbor", NW(i, j) should be equal to NW(j, i).

To further illustrate and with reference back to FIG. 4A, consider an example of processing performed when selecting 5 disk extents for a single mapped RAID extent Q being allocated from the pool Assume the 5 disk extents selected for forming mapped RAID extent Q have been selected from PD 0, PD 1, PD 2, PD 3 and PD 4 (e.g., 1 disk extent selected from each of PDs 0-4). In this case, the neighborhood matrix may be updated as a result of the foregoing selection of 5 disk extents whereby the following entries of the matrix may each be incremented by one (1):

| | | | |
|---|---|---|---|
| 0, 1 | 0, 2 | 0, 3 | 0, 4 |
| 1, 0 | 1, 2 | 1, 3 | 1, 4 |
| 2, 0 | 2, 1 | 2, 3 | 2, 4 |
| 3, 0 | 3, 1 | 3, 2 | 3, 4 |
| 4, 0 | 4, 1 | 4, 2 | 4, 2 |

If mapped RAID extents are distributed evenly among the N PDs of the pool, the values stored in cells or entries of the matrix should be the same, or approximately so (e.g., within some specified tolerance or amount of one another) and also excluding the diagonal. Therefore, techniques herein may select different disk extents when allocating to form a mapped RAID extent where such selection results in the values stored across entries in the matrix almost the same after completing RAID extent allocation. Generally, any suitable technique may be used which attempts to have a goal of such even distribution to minimize differences or variances between values of entries in the neighborhood matrix.

Figure 6:
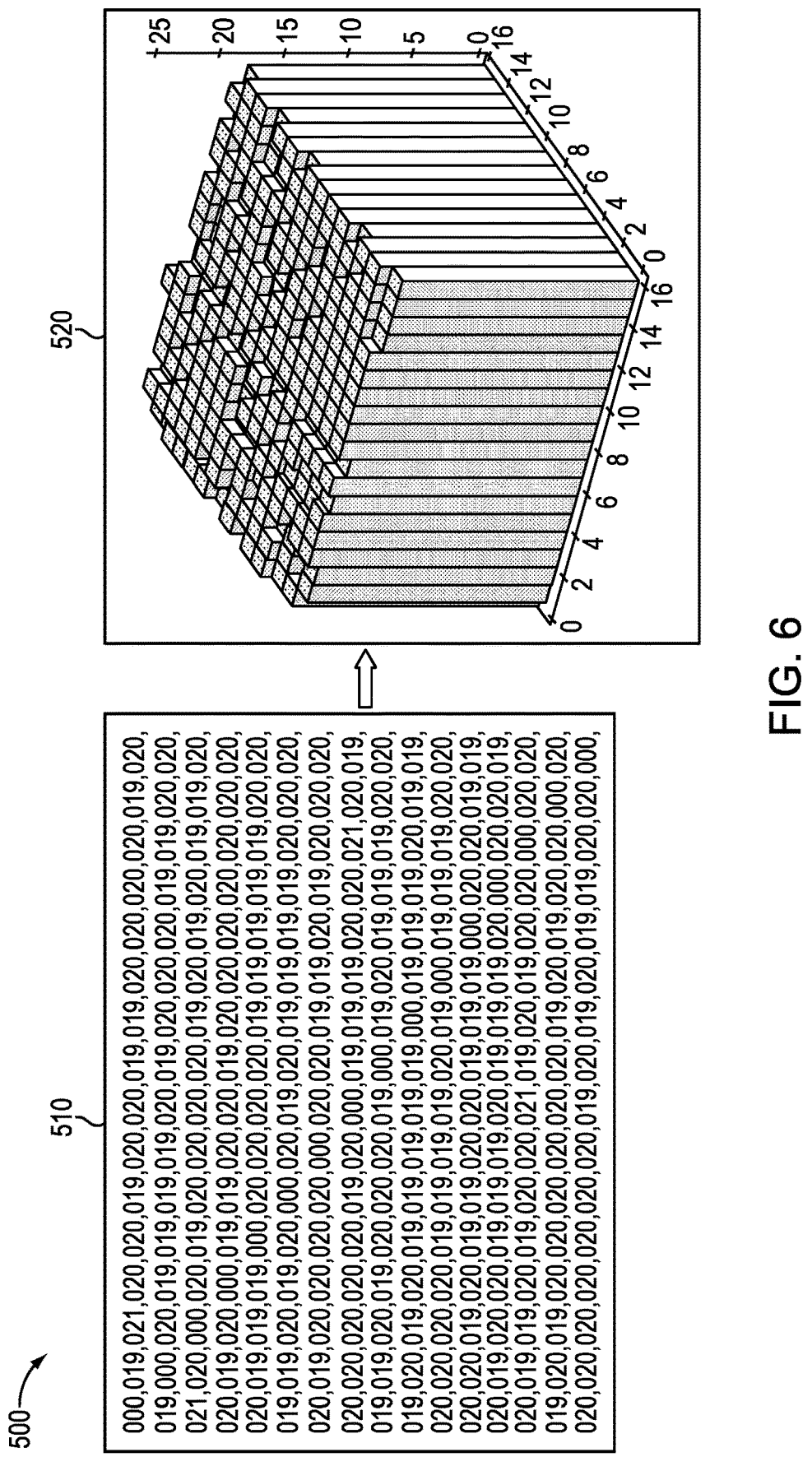
FIG. 6 is an example illustrating a good relatively even distribution of mapped RAID extents.

Referring to FIG. 6, shown is an example 500 illustrating a good or desired distribution of values in the neighborhood matrix in an embodiment in accordance with techniques herein. Element 510 illustrates the matrix have values in entries which are relatively close to one another, such as approximately the same within some specified tolerance or difference. For example, in the matrix 510, values of entries in the matrix range from 19-21, inclusively. Element 520 provides a visualization of the values in the matrix 510 whereby the element 520 illustrates a relatively flat or even distribution.

Figure 7:
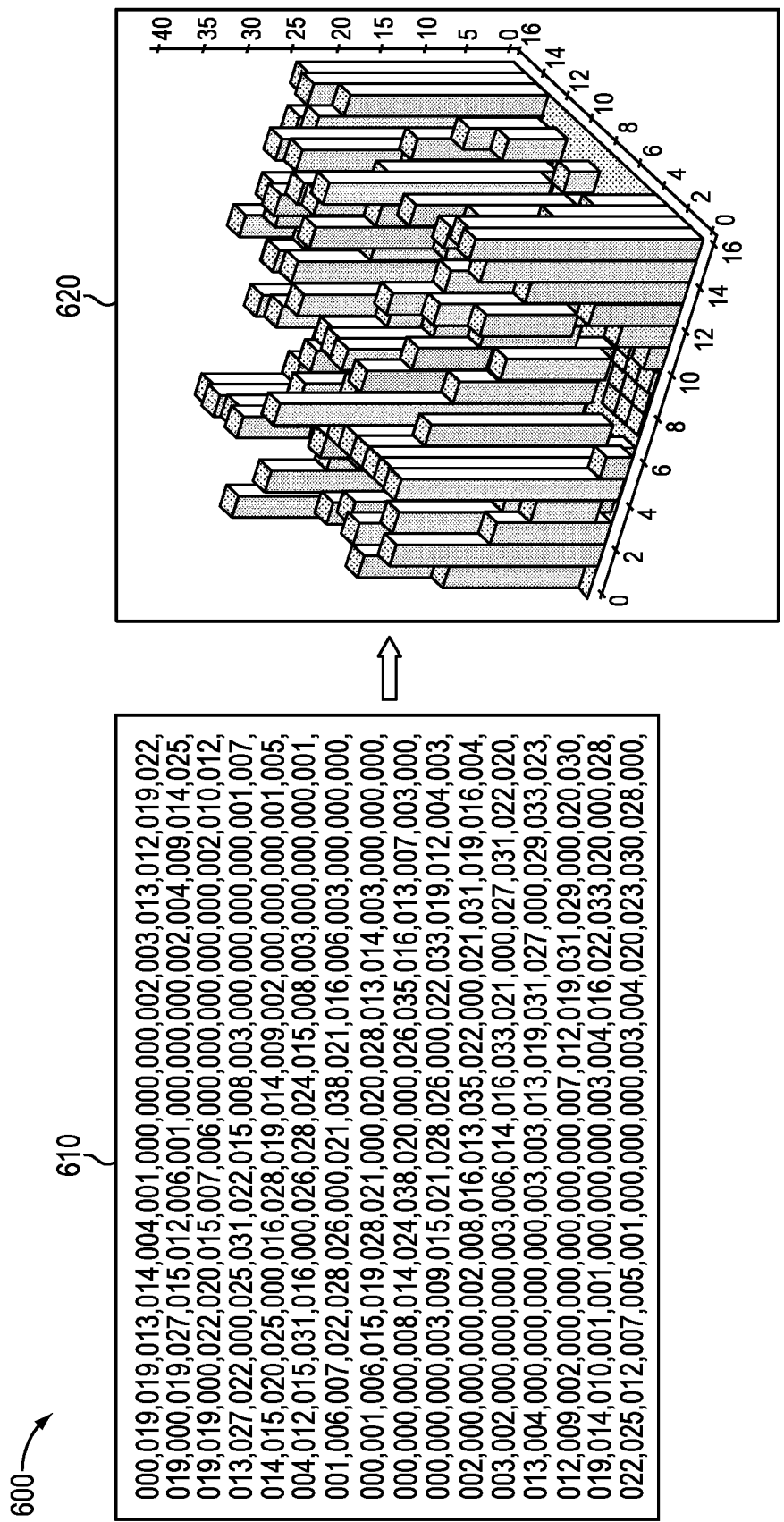
FIG. 7 is an example illustrating a relatively uneven distribution of mapped RAID extents across storage devices of a pool.

Referring to FIG. 7, shown is an example 600 illustrating a bad or undesired distribution of values in the neighborhood matrix in an embodiment in accordance with techniques herein. Element 610 illustrates the matrix have values in entries which are not relatively close to one another, such as not approximately the same within some specified tolerance or difference. For example, in the matrix 610, values of entries in the matrix have a wide and varying range with some values being zero which means that some PDs never neighbor each other. Therefore, in this case, if one PD fails, some PDs would not participate in the rebuilding procedure. Element 620 provides a visualization of the values in the matrix 610 whereby the element 620 does not illustrate a relatively flat or even distribution (e.g., as may be contrasted with element 520 of FIG. 6).

Generally, as described with respect to FIG. 6 above, when the neighborhood matrix is "flat," the "neighbor times" between PDs are similar, meaning the data storage systems may allocate similar disk extent counts from the PDs no matter what the real PD capacity is. For a pool with hybrid PD capacity, this may waste large amounts of PD capacity.

In some implementations, to take into account a PD capacity factor, the data storage system may, in at least some embodiments, make use of a weighted neighborhood matrix (WNM) defined below by example:

$WNM_{i,j} = NM_{i,j} * S_{typical} * S_{typical} / (S_i * S_j)$, where $S_{typical}$: defined generally as the typical PD size in the pool, which may be minimal or other typical PD size in the pool.

$S_i$, $S_j$: defined generally as the size of the i-th or j-th PD in the pool.

With this weighted neighborhood matrix, the data storage system may normalize a larger PD's "neighborhood times" with other PDs by a typical PD size. Therefore, the data storage system may allocate more extents from this PD to make the matrix more "flat." In some implementations, if the data storage system evenly distributes the RAID extents to PDs in the pool with the bias to larger PDs, values in the matrix may be closer to each other. Therefore, the data storage system may use an algorithm, which may make values in the weighted neighborhood matrix almost the same after completing the RAID extents allocation.

In at least one embodiment, a RAID extent selection algorithm may be performed to select disk extents for use in formation of a mapped RAID extent. For convenience and consistent with other discussion herein, assume the number of PDs in the pool is N and the RAID extent width is M. So there should be $C_n^m$ possible ways to combine or select disk extents in connection with forming a single mapped RAID extent. As an example and continuing with a RAID-5 configuration with a RAID extent width of 5, 4D+1P (e.g., 4 data members and 1 parity member) mapped onto a pool including 16 PDs (e.g., N=16) 16 disks, in this case, there are totally $C_{16}^5 = 4368$ ways to allocate a mapped RAID extent from the 16 PDs of the pool (e.g., select 5 disk extents from 5 PDs from a pool of 16 PDs).

After allocating a mapped RAID extent, the matrix may be updated accordingly as described herein. While allocating disk extents for the mapped RAID extent formation, an attempt may be made to try all the possible disk extent combinations, and select the one which would make the matrix more "flat". In other words, processing may be performed to select the particular set or combination of disk extents which would make numbers in the matrix much closer to each other. For example, an embodiment may use a suitable metric, measurement or statistic, such as variance. For example, an embodiment may use the variance of all values in matrix entries as the indicator or measurement of "flatness" (e.g., indicator or measurement of evenness of the distribution of matrix entries).

For each mapped RAID extent allocation, an embodiment may loop over all the possible choices or combination of disk extents, and select the "best" one, which will make the matrix more "flat" (e.g. select the 5 disk extents for the mapped RAID extent from the 5 PDs which results in the minimum or smallest variance with respect to the matrix entries). In such an embodiment, eventually when all the mapped RAID extents are allocated, we expect the final matrix is also "flat", or approximately so, which is close to global optimization solution.

However, when N, the number of PDs in the pool is large, the number of all possible choices or combinations may be unacceptably large whereby considering each such combination as described above becomes computationally unacceptable and/or impractical in implementation (e.g., does not scale as N increases). For example, consider the case where N is 100 and M is 5, whereby $C_{100}^5=75287520$. For each mapped RAID extent allocation in this example, evaluating all the possible choices is extremely time consuming. Thus, as a variation in at least one embodiment in accordance with techniques herein, processing may be performed to randomly select a subset of all possible choices or combination for evaluation/consideration, and for each mapped RAID extent allocation, processing may be performed which only considers/evaluates the small subset (from which one combination is selected for the single mapped RAID extent allocation). For example, in the above case, when N is 100 and M is 5, an embodiment may randomly select and use 3000 distinct combinations as included in the small subset. In at least one embodiment when selecting a subset of all possible combinations evaluated or under consideration, a rule may be imposed whereby, for the subset of combinations, all PDs of the pool should be covered by the subset. For example, assume the subset is 3000 where 3000 possible combinations of 5 PDs are randomly selected from the possible total number of 75287520 combinations. In addition, the 3000 combinations of the subset selected for further evaluation and consideration may further be required to cover or include combinations which span, collectively, across all 100 PDs (e.g., cannot select 3000 combinations for the subset where one of the PDs does not appear in any one of the 3000 combinations; in other words each of the 100 PDs must be included in at least one of the 3000 combinations of the randomly selected subset).

In another embodiment, a sparing operation may be executed to select new disk extents to replace all of the consumed disk extents on a PD detected to be in an inoperative state (e.g., failed, removed, etc.) such that the RAID extents impacted by the inoperative state can be rebuilt using the selected new disk extents. It should be further understood that the sparing operation may be based on the matrix as described above. For example, the sparing operation may attempt to achieve a "flat" neighborhood matrix or "flat" weighted neighborhood matrix, which may in turn ensure better rebuilding performance. The sparing operation may, therefore, leverage the matrix to select disk extent replacements such that the matrix remains "flat". For example, in at least one embodiment, the sparing operation may perform the following steps to handle a failure of disk S, whereby in this particular example the disk numbers in the pool is N, the RAID extent width is M, and the number of failed disk is S:

1. Loop over all of the RAID extents to identify each of the RAID extents that consume disk extents on disk S and start with the first of the identified RAID extents.
2. For the relevant RAID extent, the disk extent on disk S is no longer neighbors of the other disk extents of the RAID extent so the neighbor values relating to disk S in the matrix (e.g., neighborhood matrix, weighted neighborhood matrix, etc.) should be discarded or amended.
3. Loop over all disks in pool to identify candidate disks for the RAID extent whereby the candidate disks have free disk extents not touched by the RAID extent.
4. For each candidate disk (denoted as "I"), the value in the matrix (e.g., neighborhood matrix, weighted neighborhood matrix, etc.) for disk i and current M−1 disks in the RAID extent can be denoted as $\{V_1, V_2, V_3, \ldots, V_{m-1}\}$.
5. Sum up the values $\{V_1, V_2, V_3, \ldots, V_{m-1}\}$ for each candidate to create score[i].
6. Identify candidate disk which generates the minimum score to select the spare disk extent for the RAID extent.
7. Update the matrix (e.g., neighborhood matrix, weighted neighborhood matrix, etc.).
8. Loop over all degraded RAID extents identified in step 1 and perform step 2 to step 7, the replacements for all RAID extents can be confirmed.

Figure 8:
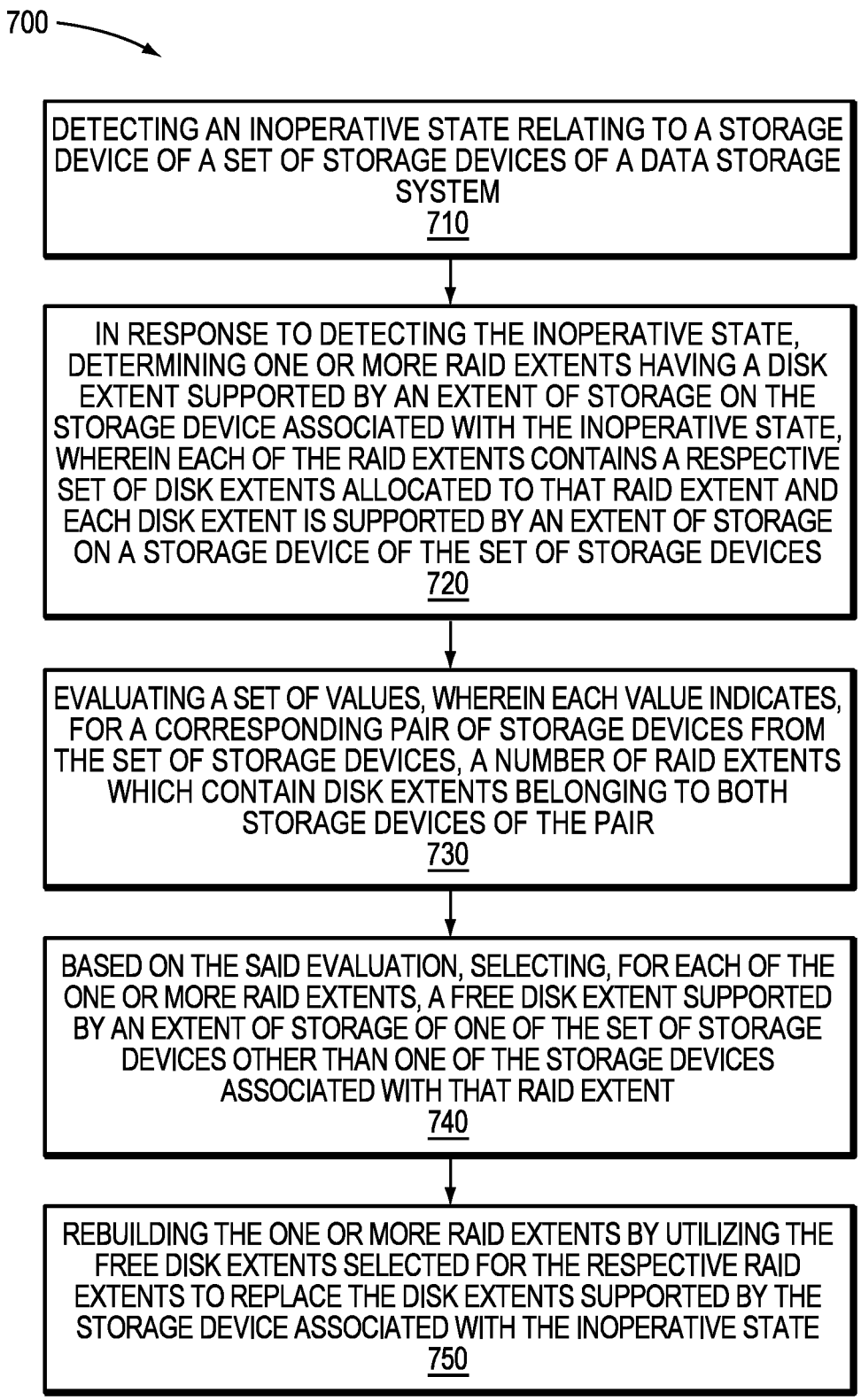
FIG. 8 is a flowchart of processing steps that may be performed in an embodiment in accordance with techniques herein.
Figure 10C:
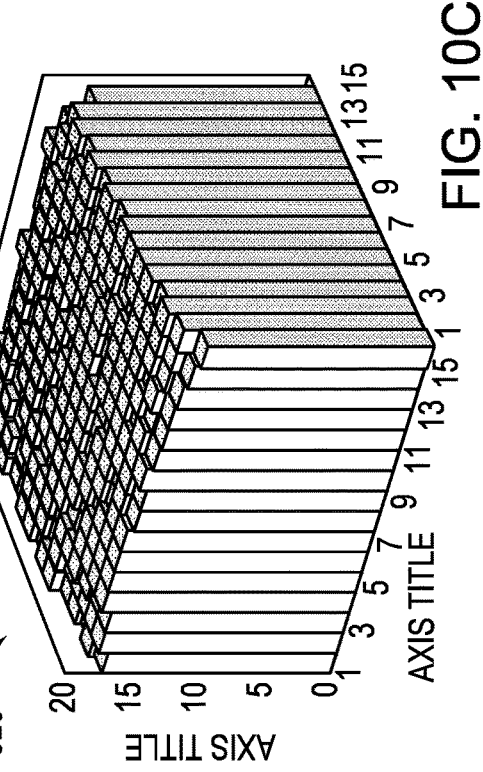
FIGS. 10A-10D illustrate the distribution of values in a neighborhood matrix and a weighted neighborhood matrix before and after sparing in an embodiment in accordance with techniques herein.
Figure 10D:
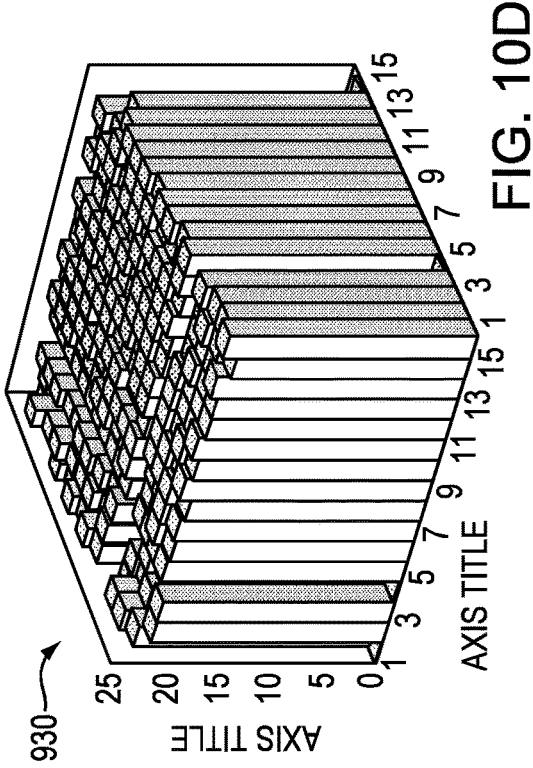
Figure 10A:
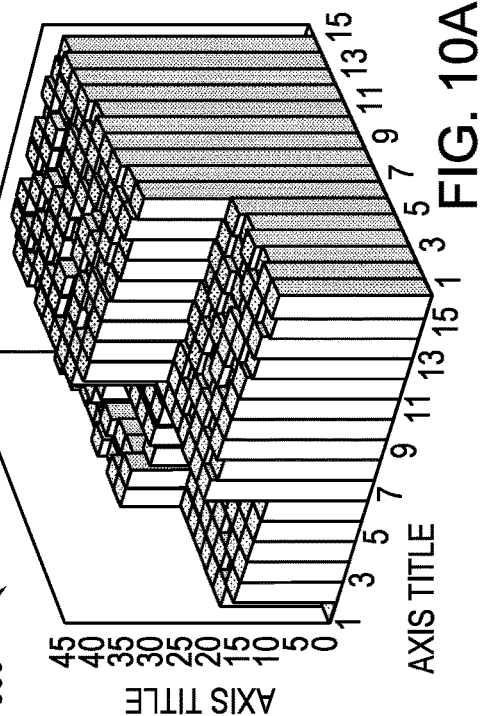
Figure 10B:
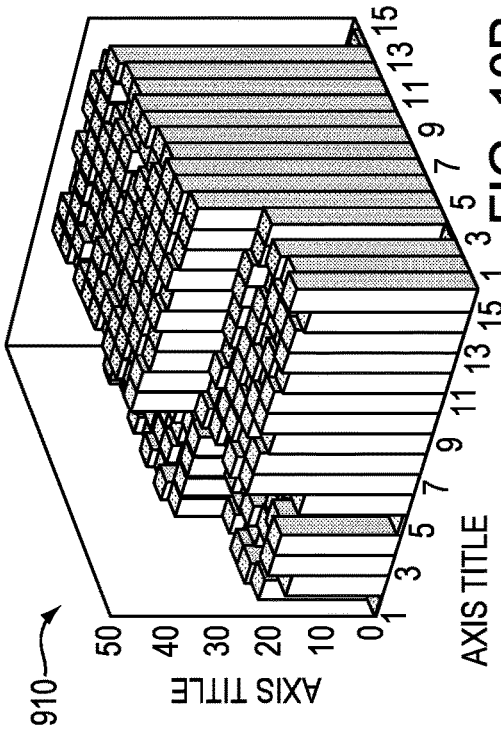

The following steps of a method 700 may be performed in an embodiment in accordance with techniques herein with reference to FIG. 8. In step 710, detecting an inoperative state relating to a storage device of a set of storage devices of a data storage system. In step 720, in response to detecting the inoperative state, determining one or more RAID extents having a disk extent supported by an extent of storage on the storage device associated with the inoperative state, wherein each of the RAID extents contains a respective set of disk extents allocated to that RAID extent and each disk extent is supported by an extent of storage on a storage device of the set of storage devices. In step 730, evaluating a set of values, wherein each value indicates, for a corresponding pair of storage devices from the set of storage devices, a number of RAID extents which contain disk extents belonging to both storage devices of the pair. In step 740, based on the said evaluation, selecting, for each of the one or more RAID extents, a free disk extent supported by an extent of storage of one of the set of storage devices other than one of the storage devices associated with that RAID extent. In step 750, rebuilding the one or more RAID extents by utilizing the free disk extents selected for the respective RAID extents to replace the disk extents supported by the storage device associated with the inoperative state.

FIG. 9 is an example illustrating a neighborhood matrix/weighted neighborhood matrix 800 defining possible new RAID extent configurations in an embodiment in accordance with techniques herein. In this particular embodiment, one of the PDs (not illustrated) in the pool has failed and four PDs (1, 2, 3 and 5) remain operative in connection with the impacted RAID extent. In response to the failure, a number of possible new RAID extent configurations are defined. For example, in this particular embodiment, each of the possible new RAID extent configurations include a new PD to replace the failed PD. The values associated with the operative PDs (i.e., PDs 1, 2, 3 and 5) in the respective possible new RAID extent configurations are then summed to create a number of scores. The minimum score is subsequently identified and the new PD in the possible new RAID extent configuration associated with the minimum score is selected to provide a free disk extent in order to replace the disk extent associated with the PD that has failed.

FIGS. 10A-10D illustrate the distribution of values in a neighborhood matrix and a weighted neighborhood matrix before and after sparing in an embodiment in accordance with techniques herein. The matrix 900 and matrix 910 illustrate distributions of values in a neighborhood matrix before and after sparing, respectfully. The matrix 920 and matrix 930 illustrate distributions of values in a weighted neighborhood matrix before and after sparing, respectfully. The weighted neighborhood matrix (920, 930), advantageously, illustrates a relatively flat or even distribution of values compared with the neighborhood matrix (900, 910).

Described above are techniques that may be used to layout mapped RAID extents with a goal of distributing disk extents forming such mapped RAID extents evenly across all PDs of the pool. With such techniques described herein, when PD of the pool fails, all the other PDs are involved in the entire rebuilding procedure (e.g., used to rebuild or reconstruct the data of the failed PD). Therefore, the rebuilding performance is improved over performance typical or expected with existing traditional RAID groups. As described above, techniques herein may use a neighborhood matrix/weighted neighborhood matrix to evaluate whether the mapped RAID extents are evenly distributed across PDs of the pool. In at least one embodiment, a small subset of combinations may be selected for evaluation and consideration rather than the entire set of combinations in efforts to reduce the computing complexity and associated computation time and resources utilized.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method, comprising:
   detecting an inoperative state relating to a storage device of a set of storage devices of a data storage system;
   in response to detecting the inoperative state, determining one or more RAID extents having a disk extent supported by an extent of storage on the storage device associated with the inoperative state, wherein each of the RAID extents contains a respective set of disk extents allocated to that RAID extent and each disk extent is supported by an extent of storage on a storage device of the set of storage devices;
   evaluating a set of values, wherein each value indicates, for a corresponding pair of storage devices from the set of storage devices, a number of RAID extents which contain disk extents belonging to both storage devices of the pair;
   based on the said evaluation, selecting, for each of the one or more RAID extents, a free disk extent supported by an extent of storage of one of the set of storage devices other than one of the storage devices associated with that RAID extent; and
   rebuilding the one or more RAID extents by utilizing the free disk extents selected for the respective RAID extents to replace the disk extents supported by the storage device associated with the inoperative state;
   wherein each of the one or more RAID extents requires a free disk extent from one of the set of storage devices not associated with that RAID extent to facilitate rebuild of that RAID extent, and
   wherein the said evaluating comprises:
      for each of the one or more RAID extents:
      calculating one or more scores in connection with one or more possible new configurations for the RAID extent that include disk extents from the operative storage devices of the RAID extent and one of the set of storage devices not associated with the RAID extent, wherein the one or more scores are calculated by summing values from the set of values that describe the one or more possible new configurations for the RAID extent;
      identifying a minimum score from the said one or more scores, wherein the minimum score is associated with one of the one or more possible new configurations; and
      based on the minimum score, selecting the storage device associated with the one of the one or more possible new configurations to provide the free disk extent to the RAID extent.

2. The method as claimed in claim 1, wherein the said evaluating is performed in accordance with a neighborhood matrix that includes the values for each pair of storage device of the set of storage devices.

3. The method as claimed in claim 2, wherein the neighborhood matrix includes N rows and N columns and wherein each entry (I, J) of the neighborhood matrix located at row I, column J denotes a count of how many times storage device I has neighbored storage device J in RAID extents such that the two storage devices I and J are neighbors with each other each time a disk extent from storage device I and a disk extent from storage device J are included in the same RAID extent.

4. The method as claimed in claim 1, wherein the values are weighted based on the capacity of a storage device of the set of storage devices.

5. The method as claimed in claim 1, wherein the values are weighted based on the capacity of a typical storage device of the set of storage devices and the capacity of the pair of storage devices associated with the value.

6. An apparatus, comprising:
   memory; and
   processing circuitry coupled to the memory, the memory storing instructions which, when executed by the processing circuitry, cause the processing circuitry to:
      detect an inoperative state relating to a storage device of a set of storage devices of a data storage system;
      in response to detecting the inoperative state, determine one or more RAID extents having a disk extent supported by an extent of storage on the storage device associated with the inoperative state, wherein each of the RAID extents contains a respective set of disk extents allocated to that RAID extent and each disk extent is supported by an extent of storage on a storage device of the set of storage devices;
      evaluate a set of values, wherein each value indicates, for a corresponding pair of storage devices from the set of storage devices, a number of RAID extents which contain disk extents belonging to both storage devices of the pair;

based on the said evaluation, select, for each of the one or more RAID extents, a free disk extent supported by an extent of storage of one of the set of storage devices other than one of the storage devices associated with that RAID extent; and rebuild the one or more RAID extents by utilizing the free disk extents selected for the respective RAID extents to replace the disk extents supported by the storage device associated with the inoperative state;

wherein each of the one or more RAID extents requires a free disk extent from one of the set of storage devices not associated with that RAID extent to facilitate rebuild of that RAID extent, and wherein the said evaluating comprises:
for each of the one or more RAID extents:
calculating one or more scores in connection with one or more possible new configurations for the RAID extent that include disk extents from the operative storage devices of the RAID extent and one of the set of storage devices not associated with the RAID extent, wherein the one or more scores are calculated by summing values from the set of values that describe the one or more possible new configurations for the RAID extent;
identifying a minimum score from the said one or more scores, wherein the minimum score is associated with one of the one or more possible new configurations; and
based on the minimum score, selecting the storage device associated with the one of the one or more possible new configurations to provide the free disk extent to the RAID extent.

7. The apparatus as claimed in claim 6, wherein the said evaluating is performed in accordance with a neighborhood matrix that includes the values for each pair of storage device of the set of storage devices.

8. The apparatus as claimed in claim 7, wherein the neighborhood matrix includes N rows and N columns and wherein each entry (I, J) of the neighborhood matrix located at row I, column J denotes a count of how many times storage device I has neighbored storage device J in RAID extents such that the two storage devices I and J are neighbors with each other each time a disk extent from storage device I and a disk extent from storage device J are included in the same RAID extent.

9. The apparatus as claimed in claim 6, wherein the values are weighted based on the capacity of a storage device of the set of storage devices.

10. The apparatus as claimed in claim 6, wherein the values are weighted based on the capacity of a typical storage device of the set of storage devices and the capacity of the pair of storage devices associated with the value.

11. A computer program product having a non-transitory computer readable medium which stores a set of instructions, the set of instructions, when carried out by processing circuitry, causing the processing circuitry to perform a method of:

detecting an inoperative state relating to a storage device of a set of storage devices of a data storage system;

in response to detecting the inoperative state, determining one or more RAID extents having a disk extent supported by an extent of storage on the storage device associated with the inoperative state, wherein each of the RAID extents contains a respective set of disk extents allocated to that RAID extent and each disk extent is supported by an extent of storage on a storage device of the set of storage devices;

evaluating a set of values, wherein each value indicates, for a corresponding pair of storage devices from the set of storage devices, a number of RAID extents which contain disk extents belonging to both storage devices of the pair;

based on the said evaluation, selecting, for each of the one or more RAID extents, a free disk extent supported by an extent of storage of one of the set of storage devices other than one of the storage devices associated with that RAID extent; and rebuilding the one or more RAID extents by utilizing the free disk extents selected for the respective RAID extents to replace the disk extents supported by the storage device associated with the inoperative state;

wherein each of the one or more RAID extents requires a free disk extent from one of the set of storage devices not associated with that RAID extent to facilitate rebuild of that RAID extent, and wherein the said evaluating comprises:
for each of the one or more RAID extents:
calculating one or more scores in connection with one or more possible new configurations for the RAID extent that include disk extents from the operative storage devices of the RAID extent and one of the set of storage devices not associated with the RAID extent, wherein the one or more scores are calculated by summing values from the set of values that describe the one or more possible new configurations for the RAID extent;
identifying a minimum score from the said one or more scores, wherein the minimum score is associated with one of the one or more possible new configurations; and
based on the minimum score, selecting the storage device associated with the one of the one or more possible new configurations to provide the free disk extent to the RAID extent.

12. The computer program product as claimed in claim 11, wherein the said evaluating is performed in accordance with a neighborhood matrix that includes the values for each pair of storage device of the set of storage devices.

13. The computer program product as claimed in claim 12, wherein the neighborhood matrix includes N rows and N columns and wherein each entry (I, J) of the neighborhood matrix located at row I, column J denotes a count of how many times storage device I has neighbored storage device J in RAID extents such that the two storage devices I and J are neighbors with each other each time a disk extent from storage device I and a disk extent from storage device J are included in the same RAID extent.

14. The computer program product as claimed in claim 11, wherein the values are weighted based on the capacity of a storage device of the set of storage devices.

15. The computer program product as claimed in claim 11, wherein the values are weighted based on the capacity of a typical storage device of the set of storage devices and the capacity of the pair of storage devices associated with the value.

* * * * *